United States Patent
Shimamura et al.

(10) Patent No.: US 7,147,796 B2
(45) Date of Patent: Dec. 12, 2006

(54) IRON OXIDE PARTICLES AND METHOD FOR PRODUCTION THEREOF

(75) Inventors: Hiroyuki Shimamura, Tokyo (JP); Masahiro Miwa, Tamano (JP)

(73) Assignee: Mitsui Mining & Smelting Company, Ltd., Tokyo (JP)

( * ) Notice: Subject to any disclaimer, the term of this patent is extended or adjusted under 35 U.S.C. 154(b) by 210 days.

(21) Appl. No.: 10/492,419

(22) PCT Filed: Oct. 15, 2002

(86) PCT No.: PCT/JP02/10653

§ 371 (c)(1), (2), (4) Date: Apr. 12, 2004

(87) PCT Pub. No.: WO03/033407

PCT Pub. Date: Apr. 24, 2003

(65) Prior Publication Data

US 2005/0069705 A1   Mar. 31, 2005

(30) Foreign Application Priority Data

Oct. 15, 2001 (JP) .............................. 2001-316590

(51) Int. Cl.
*C01G 49/00* (2006.01)

(52) U.S. Cl. .............................. 252/62.56; 252/62.58; 252/62.64; 428/403

(58) Field of Classification Search ..................... None
See application file for complete search history.

(56) References Cited

U.S. PATENT DOCUMENTS 5,294,492 A * 3/1994 Oka et al. .................... 428/403
2005/0152828 A1* 7/2005 Aga et al. ................ 423/594.2

FOREIGN PATENT DOCUMENTS

| JP | 53-136038 | 11/1978 |
| JP | 58-123548 | 7/1983 |
| JP | 07-335417 | 12/1995 |
| JP | 2000-239021 | 9/2000 |
| JP | 2000-335920 | 12/2000 |

OTHER PUBLICATIONS

Translation of JP 2000-239021, Sep. 2000.*

* cited by examiner

*Primary Examiner*—C. Melissa Koslow
(74) *Attorney, Agent, or Firm*—Young & Thompson

(57) ABSTRACT

Iron oxide particles having the surface thereof coated with a layer of a complex iron oxide containing Al and Mg are disclosed. The total content of Al and Mg in the complex iron oxide layer is 0.1 to 2.5% by weight based on the whole iron oxide particles. The Mg content in the complex iron oxide layer is 0.05 to 1% by weight based on the whole iron oxide particles. The Al content in the complex iron oxide layer is 0.05 to 1.7% by weight based on the whole iron oxide particles. The Mg content in the complex iron oxide layer is 20% or more based on the total Mg content of the whole iron oxide particles.

11 Claims, No Drawings

IRON OXIDE PARTICLES AND METHOD FOR PRODUCTION THEREOF

TECHNICAL FIELD

The present invention relates to iron oxide particles and a process of producing the same. More particularly, it relates to iron oxide particles coated with an Al- and Mg-containing complex iron oxide layer which exhibit high electrical resistance and high saturation magnetization, undergo reduced deterioration in saturation magnetization and are particularly suitable for applications, such as magnetic carriers for electrostatic copying and magnetic toners of electrostatic copying, and to a process of producing the same.

BACKGROUND ART

Magnetite particles prepared through an aqueous solution reaction have recently found wide use as a material of magnetic carriers or magnetic toners of electronic copiers, printers, and the like. While various general development characteristics are demanded in these applications, higher characteristics have come to be required with the latest rapid advancement in copiers and printers using digital technology as boosted by the development of electrophotographic techniques.

That is, the copiers and printers are now required to output high quality images such as graphics and photographs as well as letters. Copiers and printers with a resolution of 1200 dpi or higher have come on the market, and the latent image formed on a photoreceptor is becoming much denser. Hence it has been keenly demanded to develop an imaging technique excellent in fine line reproduction and imaging stability.

In order for magnetic carriers and magnetic toners to meet the requirements, to have high electrical resistance is among the important characteristics required of iron oxide particles. The Applicant of the present invention discloses in JP-A-2000-239021 a technique pertaining to such iron oxide particles, in which the surface of iron oxide particles is coated with an Al/Fe complex oxide layer. According to the disclosure, highly resistant iron oxide particles are obtained. Although the technique succeeds in achieving high resistance, it has a disadvantage that the high resistance cannot be reached without thickening the Al-containing complex iron oxide layer, which turned out to result in reduction of saturation magnetization.

On the other hand, to have a high saturation magnetization and minimized susceptibility to reduction in saturation magnetization is also an important feature required of iron oxide particles for obtaining stable images in electrostatic copying applications. A magnetic carrier comprising iron oxide particles with high saturation magnetization is capable of forming a stable magnetic brush on a magnetic roller in a two-component development system. A magnetic toner comprising iron oxide particles with high saturation magnetization is expected to contribute to stable toner layer formation on a magnet roll thereby suppressing fogging on development. However, the state-of-the-art iron oxide particles are unsatisfactory in resistance against deterioration of saturation magnetization with time and by the environment. While environmental resistance is taken into account in the above-cited technique, since the complex iron oxide layer on the particle surface contains only Al in addition to iron oxide, the iron oxide particles are insufficient in achieving high saturation magnetization and controlling deterioration of saturation magnetization.

Accordingly, an object of the present invention is to provide iron oxide particles which exhibit high electrical resistance and high saturation magnetization, undergo reduced deterioration in saturation magnetization and are particularly suitable for applications, such as magnetic carriers for electrostatic copying and magnetic toners for electrostatic copying, and to provide a process of producing the same.

DISCLOSURE OF THE INVENTION

As a result of studies, the present inventors have found that the above object is accomplished by coating iron oxide particles with a complex oxide layer containing Al and Mg.

The present invention has been completed based on the above finding. The present invention provides iron oxide particles characterized in that the surface of the particles is coated with a layer of a complex iron oxide containing Al and Mg, the total content of Al and Mg in the complex iron oxide layer is 0.1 to 2.5% by weight based on the whole iron oxide particles, the Mg content in the complex iron oxide layer is 0.05 to 1% by weight based on the whole iron oxide particles, the Al content in the complex iron oxide layer is 0.05 to 1.7% by weight based on the whole iron oxide particles, and the Mg content in the complex iron oxide layer is 20% or more based on the total Mg content of the whole iron oxide particles.

The present invention also provides a preferred process for producing the above-described iron oxide particles. The process is characterized by comprising adding and mixing a water-soluble aluminum salt, a ferrous salt, and an aqueous alkali solution into a slurry containing iron oxide particles and magnesium ions and subjecting the mixed slurry to oxidation reaction at pH 5 to 9 and at 60 to 98° C.

The present invention also provides another preferred process for producing the above-described iron oxide particles. The process comprises the steps of adding and mixing a water-soluble aluminum salt, a ferrous salt, and an aqueous alkali solution into a slurry containing iron oxide particles and subjecting the mixed slurry to oxidation reaction at pH 5 to 9 and 60 to 98° C., which is characterized in that a water-soluble magnesium salt is added in a manner selected from the group consisting of (1) a manner in which the water-soluble magnesium salt is added to the ferrous salt before the ferrous salt is added to the slurry containing the iron oxide particles, (2) a manner in which the water-soluble magnesium salt is added to the slurry containing the iron oxide particles during the addition and mixing of the water-soluble aluminum salt, the ferrous salt, and the aqueous alkali solution into the slurry containing the iron oxide particles or after the addition and mixing and before the start of the oxidation reaction, and (3) a manner in which the water-soluble magnesium salt is added to the slurry containing the iron oxide particles during the oxidation reaction.

BEST MODE FOR CARRYING OUT THE INVENTION

The modes for carrying out the present invention will hereinafter be described. The iron oxide particles as referred to in the present invention preferably include those mainly comprising magnetite. Those containing various effective elements, such as silicon and aluminum, are also included. In what follows, the present invention will be described with particular reference to magnetite particles which are exemplary iron oxide particles. The terms "iron oxide particles" and "magnetite particles" as used herein are intended to mean individual particles or the whole particles, which depend on the context.

The magnetite particles have the surface thereof coated with a layer of a complex iron oxide containing Al and Mg. Core magnetite particles, which are a core material, are usually prepared in a wet process, but those prepared in a dry process are useful as well. As stated previously, the core magnetite particles may contain various effective elements, such as silicon and aluminum.

It is unclear why the magnetite particles coated with an Al- and Mg-containing complex iron oxide layer according to the present invention have high electrical resistance. Anyway, the magnetic particles of the present invention achieve the same electrical resistance as the magnetite particles coated with an Al—Fe complex oxide layer disclosed in the publication cited in "Background Art" with a smaller Al content in the complex iron oxide layer than in the latter, thereby reducing deterioration of saturation magnetization.

On the other hand, particles having the surface thereof neutralized with Al and Mg (and sometimes with added Fe) not only show hygroscopicity attributed to Al but fail to exhibit high electrical resistance as demanded.

In the magnetite particles of the present invention it is important that the Al and Mg total content in the complex iron oxide layer (i.e., the total of the Al content and the Mg content in the complex iron oxide layer) is 0.1 to 2.5% by weight based on the whole magnetite particles. If the Al and Mg total content is less than 0.1 by weight, the desired effects, such as the effect in increasing electrical resistance, are small. An Al and Mg total content exceeding 2.5% by weight can invite reductions in magnetic characteristics generally required of magnetite particles, particularly saturation magnetization. The Al and Mg total content in the complex iron oxide layer is preferably 0.7 to 2.2% by weight based on the whole magnetite particles for a good balance between electrical resistance and magnetic characteristics. The Al and Mg to Fe molar ratio, (Al+Mg):Fe, in the complex iron oxide layer is preferably 1:100 to 100:1, still preferably 5:100 to 75:25.

It is essential that the Mg content in the complex iron oxide layer is 0.05 to 1% by weight based on the whole magnetite particles. If this Mg content is less than 0.05% by weight, the electrical resistance increasing effect is small. Higher Mg contents than 1% by weight bring about no further effects in increasing electrical resistance. For a good balance between electrical resistance and magnetic characteristics, the Mg content of the complex iron oxide layer is preferably 0.2 to 0.6% by weight.

It is also essential that the Al content in the complex iron oxide layer is 0.05 to 1.7% by weight based on the whole magnetite particles. If this Al content is less than 0.05%, the electrical resistance is low. An Al content more than 1.7% by weight promises high electrical resistance but results in low saturation magnetization. For a good balance between electrical resistance and magnetic characteristics, the Al content in the complex iron oxide layer is preferably 0.4 to 0.8% by weight.

It is significant for the magnetite particles of the present invention that the ratio of the Mg content in the complex iron oxide layer to the total Mg content of the whole magnetite particles is 20% or more. Where Mg is sparse in the complex iron oxide layer on the particle surface, that is, the Mg content ratio is less than 20%, the magnetite particles not only fail to enjoy the resistance increasing effect but undergo serous deterioration of performance by the environment, particularly under high-temperature and high-humidity conditions. Preferably, where the Mg content ratio is 40% or more, the resulting magnetite particles have further increased electrical resistance (e.g., $1 \times 10^7$ Ω·cm or higher). The higher the Mg content ratio, the more preferred. With the Mg content ratio being about 95%, the effect of increasing the resistance of magnetite particles is manifested to the full, and performance deterioration under high-temperature and high-humidity conditions is prevented sufficiently.

The method of measuring the ratio of the Mg content of the complex iron oxide layer is described below concretely.

Magnetite particles coated with a complex iron oxide layer totally weighing 20 g and magnetite particles before being coated with the complex iron oxide layer which will weigh 20 g after formation of the oxide layer are separately completely dissolved in an acid. The solutions were analyzed by ICP to quantitatively determine the respective Mg contents. The difference in Mg mass is taken as the Mg content (A) present in the complex iron oxide layer and on the complex iron oxide layer.

Separately, the magnetite particles weighing 20 g are suspended in 100 ml of a 0.01 mol/l aqueous solution of potassium hydrogenphthalate (pH 4.01 at 25° C.). The suspension is stirred at 25° C. for 3 hours, followed by filtration through a membrane filter having an opening size of 0.1 μm. The magnesium content in the filtrate is measured by ICP. The analytical value is multiplied by the liquid volume to give the Mg amount (B) eluted from the particles (the Mg amount present on the complex iron oxide layer).

The ratio of the Mg content in the complex iron oxide layer to the total Mg content of the whole particles is calculated from the above results according to equation (1):

Ratio (%) of Mg content of complex iron oxide layer to total Mg content of whole particles (%)=(A−B)/(total Mg content of 20 g magnetite particles)×100    (1)

The magnetite particles of the present invention preferably have a BET specific surface area of 7 to 15 m²/g.

There recently is a tendency that magnetic toners are reducing their particle size to have improved resolution. It is desirable for magnetite used in such toners, too, to have a reduced particle size. However, magnetite particles with a reduced size lack stability of various characteristics including magnetic characteristics. The magnetite particles according to the present invention, while having a reduced particle size, are characterized by excellent stability particularly of saturation magnetization. A BET specific surface area is among the measures representing the size of such particles as magnetite. The magnetite particles of the present invention desirably have a BET specific surface area of 7 to 15 m² and a primary particle size of about 0.15 to 0.3 μm.

It is preferred for the magnetite particles of the present invention to have an electrical resistance of $1 \times 10^5$ Ω·cm or higher, particularly $1 \times 10^6$ Ω·cm or higher, and a saturation magnetization of 65 Am²/kg or higher, particularly 67 Am²/kg or higher, at 79.6 kA/m and, when allowed to stand in a 60° C. and 90% RH atmosphere for one week, has a saturation magnetization deterioration ratio of 6% or less, particularly 4% or less.

The above-mentioned preference is based on the following view. In applications as a material for magnetic carriers and magnetic toners, it is desirable for the magnetite particles to have a high electrical resistance, a high saturation magnetization, and reduced deterioration in saturation magnetization so as to provide magnetic carriers and magnetic toners which achieve high developing performance and efficient transfer properties onto paper. Such magnetic carriers and magnetic toners will produce stable images with excellent fine line reproduction and little fog.

In the present invention, the characteristics of the magnetite particles suitable as a material powder for magnetic carriers and magnetic toners are thus represented by the structure having the specific Al- and Mg-containing complex iron oxide coating layer, the specific high electrical resistance, the specific high saturation magnetization, and the specific low saturation magnetization deterioration ratio.

It is preferred for the magnetite particles of the present invention to contain Zn. The Zn content is preferably 0.5 to 5% by weight, still preferably 0.7 to 1.5% by weight, based on the whole magnetite particles.

Being coated with the Al- and Mg-containing complex iron oxide layer, the magnetite particles of the present invention have high resistance and high saturation magnetization and achieve reduction of saturation magnetization deterioration as described above. Incorporation of a Zn component into the particles brings about further increase of resistance and, in particular, further improvement on saturation magnetization. With a Zn content less than 0.5% by weight, these effects are small. More than 5% by weight of Zn does not produce effects for the addition and can cause problems such as reduction of blackness.

Preferred processes for producing the magnetite particles of the present invention will then be described. One of the processes (hereinafter referred to as process A) is characterized by comprising adding and mixing a water-soluble aluminum salt, a ferrous salt, and an aqueous alkali solution into a slurry containing magnetite particles and magnesium ions and subjecting the mixed slurry to oxidation reaction at pH 5 to 9 and at 60 to 98° C. to form an Al- and Mg-containing complex iron oxide layer on the surface of the particles.

Another preferred process for producing the magnetite particles of the present invention (hereinafter referred to as process B) comprises the steps of adding and mixing a water-soluble aluminum salt, a ferrous salt, and an aqueous alkali solution into a slurry containing magnetite particles and subjecting the mixed slurry to oxidation reaction at pH 5 to 9 and at 60 to 98° C., which is characterized in that a water-soluble magnesium salt is added in a manner selected from the group consisting of (1) a manner in which the water-soluble magnesium salt is added to the ferrous salt before the ferrous salt is added to the slurry containing the iron oxide particles,
(2) a manner in which the water-soluble magnesium salt is added to the slurry containing the iron oxide particles during the addition and mixing of the water-soluble aluminum salt, the ferrous salt, and the aqueous alkali solution into the slurry or after the addition and mixing and before the start of the oxidation reaction, and
(3) a manner in which the water-soluble magnesium salt is added to the slurry containing the iron oxide particles during the oxidation reaction.

In the above-described processes, the magnetite particles (core particles) in the slurry containing magnetite particles are not limited in shape in any way as long as they have such particulate shapes as octahedrons, hexahedrons, and spheres.

The water-soluble aluminum salt used in the processes includes aluminum sulfate, aluminum chloride, and aluminum nitrate.

The water-soluble magnesium salt used in the processes includes magnesium sulfate, magnesium chloride, and magnesium nitrate.

The ferrous salt which can be used in the invention is not particularly limited as long as it is water-soluble and includes ferrous sulfate and ferrous chloride. The alkali solution which can be used includes an aqueous alkali hydroxide solution, such as an aqueous sodium hydroxide solution or an aqueous potassium hydroxide solution. The oxidation is carried out by bubbling with an oxygen-containing gas, preferably air.

What is significant for the processes consists in that Al, Mg, and Fe co-exist in the reaction slurry in the form of their salts during the oxidation reaction for complex iron oxide layer formation and during aging of the slurry after the oxidation reaction. The influences of the treatment under such conditions upon the effects of the invention have not been clearly elucidated, the data obtained in Examples hereinafter given imply that such conditions favor to formation of a complex iron oxide layer composed of these three elements.

In a process for the production, a water-soluble magnesium salt is added to (a) a raw material for forming starting magnetite particles of the magnetite particles-containing slurry, namely core magnetite particles, (b) the system for forming the core magnetite particles or (c) the slurry before the reaction for forming the Al—Mg—Fe complex oxide layer, and the slurry after the addition is maintained at a pH of 5 to 9 (process A). In another process, a water-soluble magnesium salt is added according to any one of the aforementioned manners (1) to (3), and the slurry after the addition is maintained at a pH of 5 to 9 (process B, modes (1) to (3)).

In either process, it is important that the system be maintained at a pH of 5 to 9 while the Al—Mg—Fe complex oxide layer is being formed. This pH limitation is based on the character of element magnesium. When a generally employed wet process is followed, the Mg component is hardly incorporated into core magnetite particles in a slurry after neutralization and mixing and is allowed to remain in the Al—Fe complex oxide layer as long as the slurry is kept neutral between pH 5 and 9. If the pH of the slurry is lower than 5, there would be such problems as goethite formation. At a pH higher than 9, the Mg component would be incorporated into the inside of the magnetite particles without remaining in the complex iron oxide layer, resulting in a failure to produce the magnetite particles of the present invention.

In either of processes A and B, the following manner is preferred to follow. The slurry after the oxidation reaction is aged at an adjusted pH of 9 to 12 for at least 5 hours prior to working-up (work-up) procedures. In this case, Mg is more easily incorporated into the Al—Fe complex oxide layer.

Where the pH of the aging system is lower than 9, the Mg component is hindered from being stably incorporated into the Al—Fe complex oxide layer formed on the particle surface. At a pH higher than 12, the alkali is in mere excess without making any difference in effect, which is uneconomical.

The slurry containing the complex iron oxide layer-coated magnetite particles prepared by these processes is subjected to solid-liquid separation, washing and drying in a usual manner to obtain powder. If necessary, the powder is given a physical treatment such as grinding, classification and pressing.

In the above-described processes for producing the magnetite particles of the invention, a Zn component can be made present in the finally obtained magnetite particles by adding a water-soluble zinc salt to the aqueous ferrous salt solution or by incorporating zinc into the slurried magnetite particles as a starting material. The presence of a Zn component is effective to further increase the electrical resistance and particularly the saturation magnetization of the magnetite particles as previously stated.

The present invention will now be illustrated in greater detail with reference to Examples.

EXAMPLE 1

As shown in Table 1, 50 l of an aqueous ferrous sulfate solution having an $Fe^{2+}$ concentration of 2.0 ml/l to which 1 l of an aqueous magnesium sulfate solution having an Mg concentration of 0.9 mol/l and 50l of a 3.6 N aqueous sodium hydroxide solution were mixed by stirring. At this time, the pH of the system was 6.5. Air was bubbled into the slurry at a rate of 65 l/min while maintaining at 85° C. and pH 6 to 7, and the reaction was once stopped (formation of core magnetite particles).

Into the slurry were mixed 3 l of an aqueous aluminum sulfate solution having an Al concentration of 0.6 mol/l, 5 l of an aqueous ferrous sulfate solution having an $Fe^{2+}$ concentration of 1.4 mol/l, and an aqueous sodium hydroxide solution to adjust to pH 8. The slurry temperature was 80° C. Air was bubbled through the slurry at a rate of 65 l/min to complete the oxidation reaction (formation of a complex iron oxide layer). The formed particles were collected by filtration, washed, and dried in a usual manner to obtain magnetite particles.

The resulting magnetite particles were analyzed in accordance with the following methods to determine Al, Mg and Zn contents, Mg amount eluted with an aqueous potassium hydrogenphthalate solution, electrical resistance, specific surface area, saturation magnetization, and saturation magnetization deterioration ratio after one-week storage at 60° C. and 90% RH. The results obtained are shown in Table 2.

Methods of Measurement:

(1) Al and Mg Contents in Complex Iron Oxide Layer with Respect to (Abbreviated as Wrt) Whole Particles Magnetite particles coated with a complex iron oxide layer weighing 20 g and magnetite particles before being coated with the complex iron oxide layer which would weigh 20 g after formation of the oxide layer were separately completely dissolved in an acid. The solutions were analyzed by ICP. The difference in mass was taken as the content (A) of the element present in the complex iron oxide layer and on the complex iron oxide layer.

Separately, the magnetite particles weighing 20 g were suspended in 100 ml of a 0.01 mol/l aqueous solution of potassium hydrogenphthalate (pH 4.01 at 25° C.). The suspension was stirred at 25° C. for 3 hours, followed by filtration through a membrane filter having an opening size of 0.1 μm. The element content in the filtrate was measured by ICP. The analytical value was multiplied by the liquid volume to give the element's amount (B) eluted from the particles (the amount of the element present on the complex iron oxide layer).

The content of the element in the complex iron oxide layer based on (wrt) the whole particles was obtained from these results according to equation (2):

Content of element in complex iron oxide layer wrt whole particles (%)=$(A-B)/20\times100$ (2)

(2) Zn Content Analysis

A sample was dissolved and analyzed by ICP.

(3) Ratio of Complex Iron Oxide Layer (Abbreviated as CIO Layer in Table 2) Mg Content to Total Mg Content of Whole Particles Calculated from the A and B values obtained in (1) above according to equation (1).

(4) Electrical Resistance

A sample weighing 10 g was put into a holder and compression molded under a pressure of 600 kg/cm² into a tablet of 25 mm in diameter. Electrodes were attached to the tablet, and the resistance was measured under a load of 150 kg/cm². The electrical resistance of the magnetite particles was calculated from the thickness and cross-sectional area of the sample used in the measurement and the measured electrical resistance value.

(5) Specific Surface Area

Measured with a BET specific surface area analyzer, Micromeritics 2200 supplied by Shimadzu Corp.

(6) Saturation Magnetization

Measured with a vibrating sample magnetometer, VSM-P7 manufactured by Toei Industry Co., Ltd., in an applied magnetic field of 796 kA/m and 79.6 kA/m.

(7) Saturation Magnetization Deterioration Ratio After One-Week Storage at 60° C. and 90% RH After a sample was exposed in an atmosphere of 60° C. and 90% RH for one week, a saturation magnetization was measured in an applied magnetic field of 796 kA/m in the same manner as in (6) above. The difference between the saturation magnetization before exposure and that after exposure was divided by the former, and the quotient was multiplied by 100 to give a saturation magnetization deterioration ratio.

EXAMPLE 2

Magnetite particles were produced in the same manner as in Example 1, except that the slurry after formation of the complex iron oxide layer was adjusted to pH 10 by dropwise addition of a sodium hydroxide solution and maintained at that pH for 2 hours (aging of slurry) as shown in Table 1. The product was evaluated for various properties and characteristics in the same manner as in Example 1. The results obtained are shown in Table 2.

EXAMPLE 3

Magnetite particles were produced in the same manner as in Example 2, except that the aging time was changed to 10 hours as shown in Table 1. The product was evaluated for various properties and characteristics in the same manner as in Example 1.

The results obtained are shown in Table 2.

EXAMPLE 4

Magnetite particles were produced in the same manner as in Example 3, except for changing the concentration or amount of the additives as shown in Table 1. The product was evaluated for various properties and characteristics in the same manner as in Example 1. The results obtained are shown in Table 2.

EXAMPLE 5

Magnetite particles were produced in the same manner as in Example 3, except that zinc sulfate was added to the slurry before reaction in the preparation of core magnetite particles as shown in Table 1. The product was evaluated for various properties and characteristics in the same manner as in Example 1.

EXAMPLE 6

Magnetite particles were produced in the same manner as in Example 5, except for changing the concentration or amount of the additives as shown in Table 1. The product was evaluated for various properties and characteristics in the same manner as in Example 1. The results obtained are shown in Table 2.

EXAMPLE 7

Magnetite particles were produced in the same manner as in Example 3, except for changing the concentration or amount of the additives and adding the magnesium sulfate to the aqueous ferrous sulfate solution which was used in the formation of a complex iron oxide layer as shown in Table 1. The product was evaluated for various properties and characteristics in the same manner as in Example 1. The results obtained are shown in Table 2.

EXAMPLE 8

Magnetite particles were produced in the same manner as in Example 5, except for adding the magnesium sulfate to the slurry before the start of the reaction for forming a complex iron oxide layer as shown in Table 1. The product was evaluated for various properties and characteristics in the same manner as in Example 1. The results obtained are shown in Table 2.

COMPARATIVE EXAMPLE 1

Magnetite particles were produced in the same manner as in Example 1, except that magnesium sulfate was not added as shown in Table 1. The product was evaluated for various properties and characteristics in the same manner as in Example 1. The results obtained are shown in Table 2.

COMPARATIVE EXAMPLE 2

Magnetite particles were produced in the same manner as in Comparative Example 1, except for changing the amount of the aluminum sulfate as shown in Table 1. The product was evaluated for various properties and characteristics in the same manner as in Example 1. The results obtained are shown in Table 2.

COMPARATIVE EXAMPLE 3

Magnetite particles were produced in the same manner as in Comparative Example 2, except that the slurry was aged as shown in Table 1. The product was evaluated for various properties and characteristics in the same manner as in Example 1. The results obtained are shown in Table 2.

COMPARATIVE EXAMPLE 4

The pH of the slurry after core magnetite particles formation was adjusted, and the magnesium sulfate was then added thereto, followed by aging as shown in Table 1 to produce magnetite particles. The product was evaluated for various properties and characteristics in the same manner as in Example 1. The results obtained are shown in Table 2.

COMPARATIVE EXAMPLE 5

Magnetite particles were produced in the same manner as in Comparative Example 4, except that ferrous sulfate was added to the slurry and the reaction for forming a complex iron oxide layer was carried out at pH 10 as shown in Table 1. The product was evaluated for various properties and characteristics in the same manner as in Example 1. The results obtained are shown in Table 2.

COMPARATIVE EXAMPLES 6 AND 7

Magnetite particles were produced in the same manner as in Example 3, except for changing the concentration or amount of the additives as shown in Table 1. The product was evaluated for various properties and characteristics in the same manner as in Example 1. The results obtained are shown in Table 2.

TABLE 1

| | Reaction Condition for Core Magnetite Formation | Reaction Conditions for Complex Iron Oxide (CIO) Layer | | | | | | |
|---|---|---|---|---|---|---|---|---|
| | | $ZnSO_4$ Aq. Soln. | | $Al_2(SO_4)_3$ Aq. Soln. | | $FeSO_4$ Aq. Soln. | | Reaction |
| | Reaction pH | Concn. (mol/l) | Amount (l) | Concn. (mol/l) | Amount (l) | Concn. (mol/l) | Amount (l) | Reaction pH | Temp. (° C.) |
| | | | | Examples: | | | | | |
| 1 | 6-7 | — | — | 0.6 | 3 | 1.4 | 5 | 8 | 80 |
| 2 | 6-7 | — | — | 0.6 | 3 | 1.4 | 5 | 8 | 80 |
| 3 | 6-7 | — | — | 0.6 | 3 | 1.4 | 5 | 8 | 80 |
| 4 | 6-7 | — | — | 1.8 | 3 | 2.0 | 5 | 8 | 80 |
| 5 | 6-7 | 1.3 | 1 | 0.6 | 3 | 1.4 | 5 | 8 | 80 |
| 6 | 6-7 | 1.3 | 1 | 1.2 | 3 | 1.4 | 5 | 8 | 80 |
| 7 | 12 | — | — | 0.8 | 3 | 1.4 | 5 | 8 | 80 |
| 8 | 6-7 | 1.3 | 1 | 0.6 | 3 | 1.4 | 5 | 8 | 80 |

TABLE 1-continued

Comparative Examples:

| | | | | | | | | | |
|---|---|---|---|---|---|---|---|---|---|
| 1 | 6-7 | — | — | 0.6 | 3 | 1.4 | 5 | 8 | 80 |
| 2 | 6-7 | — | — | 2.3 | 3 | 1.4 | 5 | 8 | 80 |
| 3 | 6-7 | — | — | 2.3 | 3 | 1.4 | 5 | 8 | 80 |
| 4 | 6-7 | — | — | — | — | — | — | — | — |
| 5 | 6-7 | — | — | — | — | 1.4 | 5 | 10 | 80 |
| 6 | 6-7 | — | — | 2.0 | 3 | 2.0 | 5 | 8 | 80 |
| 7 | 6-7 | — | — | 0.02 | 3 | 2.0 | 5 | 8 | 80 |

Conditions for Slurry Aging

| | Aging pH | Aged Slurry Aging Temp. (° C.) | Aging Time (hr) | Conditions for Mg Addition $MgSO_4$ Aq. Soln. Concn. (mol/l) | Amount (l) | Timing of Addition |
|---|---|---|---|---|---|---|

Examples:

| | | | | | | |
|---|---|---|---|---|---|---|
| 1 | — | — | — | 0.9 | 1 | (A) |
| 2 | 10 | 78 | 2 | 0.9 | 1 | (A) |
| 3 | 10 | 78 | 10 | 0.9 | 1 | (A) |
| 4 | 10 | 78 | 10 | 1.8 | 1 | (A) |
| 5 | 10 | 78 | 10 | 0.9 | 1 | (A) |
| 6 | 10 | 78 | 10 | 2.0 | 1 | (A) |
| 7 | 10 | 78 | 10 | 1.3 | 1 | (B) |
| 8 | 10 | 78 | 10 | 0.9 | 1 | (C) |

Comparative Examples:

| | | | | | | |
|---|---|---|---|---|---|---|
| 1 | — | — | — | — | — | — |
| 2 | — | — | — | — | — | — |
| 3 | 10 | 78 | 10 | — | — | — |
| 4 | 10 | 78 | 10 | 2.3 | 1 | (D) |
| 5 | 10 | 78 | 10 | 2.3 | 1 | (D) |
| 6 | 10 | 78 | 10 | 4.5 | 1 | (A) |
| 7 | 10 | 78 | 10 | 0.1 | 1 | (A) |

(A) Added to the aqueous ferrous sulfate solution for the reaction of core magnetite formation
(B) Added to the aqueous ferrous sulfate solution used in the reaction of complex iron oxide layer formation
(C) Added to the slurry before the start of the reaction for complex iron oxide layer formation
(D) Added to the slurry after the reaction for complex iron oxide layer formation

TABLE 2

Analytical Values

| | Zn Content wrt Whole Particles (wt %) | Al Content of CIO* Layer wrt Whole Particles (wt %) | Mg Content of CIO* Layer wrt Whole Particles (wt %) | (Al + Mg) Content of CIO* Layer wrt Whole Particles (wt %) | Mg Content of Whole Particles (wt %) | Ratio of CIO* Layer Mg Content to Total Mg Content of Whole Particles (%) | Characteristics Values Electrical Resistance ($\Omega$ cm) | BET Specific Surface Area ($m^2/g$) |
|---|---|---|---|---|---|---|---|---|

Examples:

| | | | | | | | | |
|---|---|---|---|---|---|---|---|---|
| 1 | — | 0.59 | 0.06 | 0.65 | 0.23 | 26 | $5.4 \times 10^6$ | 9.5 |
| 2 | — | 0.60 | 0.08 | 0.68 | 0.23 | 35 | $6.8 \times 10^6$ | 9.7 |
| 3 | — | 0.59 | 0.22 | 0.81 | 0.24 | 92 | $4.5 \times 10^7$ | 9.7 |
| 4 | — | 1.65 | 0.44 | 2.09 | 0.48 | 92 | $2.0 \times 10^9$ | 11.8 |
| 5 | 1.01 | 0.59 | 0.21 | 0.80 | 0.23 | 91 | $6.7 \times 10^7$ | 8.7 |
| 6 | 1.00 | 1.08 | 0.51 | 1.59 | 0.54 | 94 | $3.2 \times 10^9$ | 9.2 |
| 7 | — | 0.71 | 0.32 | 1.03 | 0.34 | 94 | $8.5 \times 10^7$ | 7.6 |
| 8 | 1.00 | 0.60 | 0.22 | 0.82 | 0.24 | 92 | $8.2 \times 10^7$ | 8.9 |

Comparative Examples:

| | | | | | | | | |
|---|---|---|---|---|---|---|---|---|
| 1 | — | 0.61 | — | 0.61 | — | — | $8.5 \times 10^4$ | 9.6 |
| 2 | — | 2.01 | — | 2.01 | — | — | $1.2 \times 10^9$ | 12.5 |
| 3 | — | 2.03 | — | 2.03 | — | — | $1.8 \times 10^9$ | 12.4 |
| 4 | — | — | 0.10 | 0.10 | 0.62 | 16 | $4.4 \times 10^4$ | 9.2 |
| 5 | — | — | 0.23 | 0.23 | 0.63 | 92 | $6.5 \times 10^4$ | 9.6 |
| 6 | — | 1.90 | 1.15 | 3.05 | 1.24 | 93 | $4.5 \times 10^9$ | 13.8 |
| 7 | — | 0.02 | 0.02 | 0.04 | 0.02 | 100 | $7.5 \times 10^4$ | 9.2 |

TABLE 2-continued

<table>
<tr><th colspan="5">Characteristics Values</th></tr>
<tr><th></th><th>Saturation Magnetization σ s (796 kA/m) (Am²/kg)</th><th>Saturation Magnetization σ s (79.6 kA/m) (Am²/kg)</th><th>Saturation Magnetization after Exposure σ s (79.6 kA/m) (Am²/kg)</th><th>Saturation Magnetization Deterioration Ratio (%)</th></tr>
<tr><td colspan="5">Examples:</td></tr>
<tr><td>1</td><td>80.7</td><td>66.1</td><td>62.6</td><td>5.3</td></tr>
<tr><td>2</td><td>80.5</td><td>67.0</td><td>63.8</td><td>4.8</td></tr>
<tr><td>3</td><td>80.5</td><td>65.9</td><td>63.9</td><td>3.0</td></tr>
<tr><td>4</td><td>79.2</td><td>65.5</td><td>65.1</td><td>0.6</td></tr>
<tr><td>5</td><td>83.6</td><td>68.6</td><td>66.6</td><td>2.9</td></tr>
<tr><td>6</td><td>80.1</td><td>66.8</td><td>66.1</td><td>1.0</td></tr>
<tr><td>7</td><td>82.1</td><td>66.2</td><td>64.9</td><td>2.0</td></tr>
<tr><td>8</td><td>83.2</td><td>68.7</td><td>66.6</td><td>3.1</td></tr>
<tr><td colspan="5">Comparative Examples:</td></tr>
<tr><td>1</td><td>80.8</td><td>66.2</td><td>63.5</td><td>4.1</td></tr>
<tr><td>2</td><td>74.9</td><td>61.9</td><td>60.9</td><td>1.6</td></tr>
<tr><td>3</td><td>75.3</td><td>61.4</td><td>60.5</td><td>1.5</td></tr>
<tr><td>4</td><td>81.1</td><td>66.1</td><td>59.5</td><td>10.0</td></tr>
<tr><td>5</td><td>80.9</td><td>65.8</td><td>59.8</td><td>9.1</td></tr>
<tr><td>6</td><td>72.5</td><td>55.4</td><td>54.9</td><td>0.9</td></tr>
<tr><td>7</td><td>82.4</td><td>66.7</td><td>59.1</td><td>11.4</td></tr>
</table>

CIO* Complex iron oxide

As is apparent from Table 2, the magnetite particles of Examples 1 to 8 had a high electrical resistance, a high saturation magnetization, and a low saturation magnetization deterioration ratio after exposure to high temperature and high humidity.

In contrast, the magnetite particles of Comparative Examples 1 to 3 do not contain Mg and have a complex iron oxide layer formed of Fe and Al as a particle surface layer. Comparative Example 1 showed a low electrical resistance. Comparative Example 2, while having a high electrical resistance, exhibited a low saturation magnetization. Comparative Example 3, in which the slurry of Comparative Example 2 was aged at pH 10 for 10 hours, made little difference in characteristics from Comparative Example 2. These results prove that complex iron oxides free from Mg fail to produce the effects of the present invention.

In Comparative Example 4, since Al was not added, the added Mg was not incorporated as a complex iron oxide as is obvious from the fact that it mostly dissolved in the potassium hydrogenphthalate solution adjusted to pH 4. As a result, the resulting magnetite particles had a low electrical resistance and a markedly high ratio of saturation magnetization deterioration by exposure to high temperature and high humidity. It is thus confirmed that an Mg-containing complex iron oxide layer does not work in the absence of Al, failing to manifest the effects of the present invention.

In Comparative Example 5, Mg was added, and the complex iron oxide layer had a high ratio of the Mg content of the complex iron oxide layer. Nevertheless the resulting magnetite particles showed little difference in characteristics from Comparative Example 4 on account of the absence of Al in the complex iron oxide layer.

Although Comparative Example 6 exhibited a high electrical resistance because of the high total content of Al and Mg, it had a low saturation magnetization. Comparative Example 7 had a high saturation magnetization but a low electrical resistance due to a small total content of Al and Mg.

INDUSTRIAL APPLICABILITY

As described above, the iron oxide particles of the present invention have the surface thereof coated with a layer of a complex iron oxide containing Al and Mg, the total content of Al and Mg in the complex iron oxide layer is 0.1 to 2.5% by weight based on the whole iron oxide particles, the Mg content in the complex iron oxide layer is 0.05 to 1% by weight based on the whole iron oxide particles, the Al content in the complex iron oxide layer is 0.05 to 1.7% by weight based on the whole iron oxide particles, and the Mg content in the complex iron oxide layer is 20% or more based on the total Mg content of the whole iron oxide particles. By virtue of these characteristics, the iron oxide particles of the present invention have high electrical resistance and high saturation magnetization and undergo reduced deterioration of saturation magnetization. Accordingly they are suited for use as a material of magnetic carriers for electrostatic copying or magnetic toners for electrostatic copying.

The above-described iron oxide particles can be produced with ease and at high productivity by the production processes according to the present invention.

The invention claimed is:

1. Iron oxide particles characterized in the that the surface of the particles is coated with a layer of a complex iron oxide containing Al and Mg, the total content of Al and Mg in the complex iron oxide layer is 0.1 to 2.5% by weight based on the whole iron oxide particles, the Mg content in the complex iron oxide layer is 0.05 to 1% by weight based on the whole iron oxide particles, the Al content in the complex iron oxide layer is 0.05 to 1.7% by weight based on the whole iron oxide particles, and the Mg content in the complex iron oxide layer is 20% or more based on the total Mg content of the whole iron oxide particles, wherein said iron oxide particles have a shape of one of an octahedron, a hexahedron and a sphere.

2. The iron oxide particles according to claim 1, which have a BET specific surface area of 7 to 15 m²/g.

3. The iron oxide particles according to claim 1, which have an electrical resistance of $1\times10^5$ Ωcm or higher and a saturation magnetization of 65 Am²/kg or higher at 79.6 kA/m and, when allowed to stand in a 60° C. and 90% RH atmosphere for one week, has a saturation magnetization deterioration ratio of 6% or lower.

4. Iron oxide particles characterized in the that the surface of the particles is coated with a layer of a complex iron oxide containing Al and Mg, the total content of Al and Mg in the complex iron oxide layer is 0.1 to 2.5% by weight based on the whole iron oxide particles, the Mg content in the complex iron oxide layer is 0.05 to 1% by weight based on the whole iron oxide particles, the Al content in the complex iron oxide layer is 0.05 to 1.7% by weight based on the whole iron oxide particles, and the Mg content in the complex iron oxide layer is 20% or more based on the total Mg content of the whole iron oxide particles, which contain Zn in the inside thereof.

5. The iron oxide particles according to claim 4, wherein the Zn content is 0.5 to 5% by weight based on the whole iron oxide particles.

6. A process of producing iron oxide particles, a surface of said iron oxide particles being coated with a layer of a complex iron oxide containing Al and Mg, the total content of Al and Mg in the complex iron oxide layer is 0.1 to 2.5% by weight based on the whole iron oxide particles, the Mg content in the complex iron oxide layer is 0.05 to 1% by weight based on the whole iron oxide particles, the Al content in the complex iron oxide layer is 0.05 to 1.7% by weight based on the whole iron oxide particles, and the Mg content in the complex iron oxide layer is 20% or more based on the total Mg content of the whole iron oxide particles, said process comprising adding and mixing a water-soluble aluminum salt, a ferrous salt, and an aqueous alkali solution into a slurry containing iron oxide particles and magnesium ions and subjecting the mixed slurry to oxidation reaction at pH 5 to 9 and at 60 to 98° C.

7. A process of producing the iron oxide particles according to claim 1 which comprises the steps of adding the mixing a water-soluble aluminum salt, a ferrous salt, and an aqueous alkali solution into a slurry containing iron oxide particles and subjecting the mixed slurry to oxidation reaction at pH 5 to 9 and 60 to 98° C., which is characterized in that a water-soluble magnesium salt is added in a manner selected from the group consisting of (1) a manner in which the water-soluble magnesium salt is added to the ferrous salt before the ferrous salt is added to the slurry containing the iron oxide particles,
 (2) a manner in which the water-soluble magnesium salt is added to the slurry containing the iron oxide particles during the addition and mixing of the water-soluble aluminum salt, the ferrous salt, and the aqueous alkali solution into the slurry containing the iron oxide particles or after the addition and mixing and before the start of the oxidation reaction, and
 (3) a manner in which the water-soluble magnesium salt is added to the slurry containing the iron oxide particles during the oxidation reaction.

8. The process according to claim 6, which is characterized in that the slurry obtained after the oxidation reaction is aged at an adjusted pH of 9 to 12 for at least 5 hours prior to a working-up procedure.

9. The process according to claim 6, wherein the iron oxide particles in the slurry containing the iron oxide particles contain Zn.

10. The process according to claim 7, which is characterized in that the slurry obtained after the oxidation reaction is aged at an adjusted pH of 9 to 12 for at least 5 hours prior to a working up procedure.

11. The process according to claim 7, wherein the iron oxide particles in the slurry containing the iron oxide particles contain Zn.

* * * * *